United States Patent [19]

Wilburn

[11] Patent Number: 4,885,524
[45] Date of Patent: Dec. 5, 1989

[54] VEHICLE BATTERY SYSTEM

[75] Inventor: William M. Wilburn, Wheelersburg, Ohio

[73] Assignee: William J. Goldcamp, Portsmouth, Ohio

[21] Appl. No.: 182,305

[22] Filed: Apr. 15, 1988

[51] Int. Cl.$^4$ .................. H01M 10/44; H02M 2/30
[52] U.S. Cl. ............................. 320/25; 307/10.1; 429/7
[58] Field of Search ............ 320/2, 25; 429/1, 121, 429/178; 307/10 R

[56] References Cited

U.S. PATENT DOCUMENTS

| | | | |
|---|---|---|---|
| 3,466,453 | 9/1969 | Greenberg | 307/10 |
| 3,625,774 | 12/1971 | Rodgers | 429/121 |
| 3,936,121 | 2/1976 | Leinberger | 339/29 |
| 3,942,027 | 3/1976 | Fima | 307/10 |
| 4,006,952 | 2/1977 | Puckett | 339/5 RL |
| 4,079,304 | 3/1978 | Brandenburg | 320/25 |
| 4,157,492 | 6/1979 | Colbrese | 320/25 |
| 4,180,746 | 12/1979 | Giuffra | 307/127 |
| 4,217,534 | 8/1980 | Cole | 320/25 |
| 4,224,383 | 9/1980 | Taylor | 429/7 |
| 4,261,634 | 4/1981 | Robinson | 339/29 |
| 4,272,142 | 6/1981 | Zapf | 339/29 |
| 4,286,172 | 8/1981 | Millonzi | 307/10 R |
| 4,349,774 | 9/1982 | Farque | 320/25 |
| 4,386,818 | 6/1983 | Millhimes et al. | 339/113 L |
| 4,400,658 | 8/1983 | Yates | 320/26 |
| 4,496,204 | 1/1985 | Conley | 339/29 B |
| 4,527,111 | 7/1985 | Branham | 320/26 |
| 4,560,230 | 12/1985 | Inglis | 339/224 |
| 4,607,209 | 8/1986 | Guim et al. | 320/25 |
| 4,637,965 | 1/1987 | Davis | 429/1 |
| 4,647,139 | 3/1987 | Yang | 339/154 |

Primary Examiner—R. J. Hickey
Attorney, Agent, or Firm—Michael Sand Co.

[57] ABSTRACT

A vehicle battery system includes a battery for providing electric current to a starter of the vehicle through a first electrical cable, and for providing and receiving electric current to and from, respectively, a remote battery through a second electrical cable for recharging a certain one of the batteries. A casing of the battery has a pair of spaced electrodes incorporated therein which establish electrical contact with an electrolyte solution contained in the casing. A pair of universal plugs is embedded in the casing and is electrically connected to the electrodes by electrical conductors also embedded in the casing. Each universal plug includes a prong and a receptacle so that the plugs are engageable with other similar universal plugs in a single orientation for maintaining proper electrical polarity therebetween. A universal plug is attached to one end of both the first and second electrical cables for engaging the plugs of the system battery. The opposite end of the first electrical cable is electrically connected to the starter and a ground of the vehicle. The opposite end of the second electrical cable has a universal plug attached thereto which is mounted on the grille of the vehicle for engaging a universal plug of a booster cable adapted to be electrically connected to a remote battery. Another embodiment of the invention includes an adapter for converting a vehicle battery of the type having a pair of spaced terminal posts to a type having a pair of universal plugs.

13 Claims, 3 Drawing Sheets

VEHICLE BATTERY SYSTEM

TECHNICAL FIELD

The invention relates to vehicle batteries and in particular to the means for electrically connecting a vehicle battery to a starter of the vehicle and to a remote battery for providing electric current to the starter and for recharging a certain one of the batteries.

BACKGROUND ART

Nearly every vehicle owner has experienced the inconvenience of turning the ignition key of his or her vehicle and hearing, instead of a starting engine, little more than the click of the rotating ignition key cylinder. In many instances, such a failure of the engine to start is the result of a "dead" battery. A dead or uncharged vehicle battery usually is the result of an excessive electrical drain placed on the battery. The most typical situation causing such an excessive drain is when the lights of the vehicle are left on for a lengthy time period after the vehicle engine has been turned off. Other well-known causes of a dead battery include extreme cold weather and excessive age of the battery. However, if often is possible to recharge a dead or low charged battery by electrically connecting it to a sufficiently charged battery, and especially the charged battery of another vehicle.

The means for electrically connecting a dead battery to a charged battery for the purpose of "jump-starting" the vehicle having the uncharged battery usually comprises a pair of electrical conductors or wires, with each wire having a clamp attached to each of its ends. This wire and clamp assembly is commonly referred to as a booster cable. Batteries of the type installed in most vehicles today have a pair of terminal posts incorporated therein, with one of the posts being positively charged and the other post being negatively charged. The posts are used for electrically connecting the vehicle battery to the starter and a ground of the vehicle and for jump-starting purposes. During the jump-starting procedure, similarly charged terminal posts of the batteries are electrically connected by engaging the clamps of one of the booster cables therewith. The engine of the vehicle having the charged battery is running during this procedure so that the charge of its battery can be transmitted through the cables to recharge the dead battery.

The proper procedure for jump-starting a vehicle with a dead battery must be carefully followed to insure that similarly charged terminal posts of the two batteries are indeed connected by separate cables. Unfortunately, individuals unfamiliar with such a procedure often attempt to jump-start a vehicle to avoid the cost of having a trained mechanic perform the procedure, or to avoid being without transportation until the mechanic arrives. Such attempts can have serious consequences. If the polarities of the batteries are mismatched or reversed, that is, a positive post of one battery is connected to a negative post of the other battery, serious damage can occur to the batteries, booster cables, and even the electrical systems of the vehicles. Furthermore, and most importantly, electrical connection of two batteries in a state of reversed polarity, or in series instead of in parallel, can cause an explosion placing the individual performing the jump-start procedure at great risk of personal injury, especially to the eyes.

Most booster cables and battery posts are color coded and/or have plus (+) and minus (−) symbols indicated in an obvious location on the cables or battery as the major safeguard against polarity reversal during jump-starting. However, such colors and symbols often are obscured if the jump-start procedure is performed in darkness or poor weather conditions. Moreover, an individual unfamiliar with proper jump-starting procedure may totally disregard the significance of the colors and symbols. Thus, the color and symbol system merely aids in the proper connection of the booster cables to the batteries for an individual familiar with proper jump-starting procedure, rather than preventing improper connection thereof.

Finally, in order to successfully jump-start a vehicle, satisfactory electrical contact must be achieved between the booster cable clamps and the terminal posts of the batteries, in addition to proper polarity connections therebetween. Such satisfactory contact often is prevented because of heavy corrosion build-up on the terminal posts. This condition can be remedied only by a thorough cleaning of the posts prior to attempting the jump-start procedure, and more particularly, prior to attaching the cable clamps to the posts for establishing electrical contact therebetween. Such cleaning can be difficult and time-consuming, and is particularly inconvenient when attempting to jump-start a vehicle in darkness or in poor weather, or when time is of the essence. Moreover, such corrosion build-up can block the transmission of electric current from the battery to the starter of the vehicle, which prevents starting of the vehicle even where the battery is sufficiently charged.

The known prior art includes various safety devices for reducing the possiblity of personal injury and property damage during a jump-starting procedure, and can be found in U.S. Pat. Nos. 3,936,121; 3,942,027; 4,006,952; 4,180,746; 4,217,534; 4,272,142; 4,286,172; 4,349,774; 4,386,818; 4,400,658; 4,496,204; 4,527,111; and 4,607,209. In addition, U.S. Pat. Nos. 4,261,634 and 4,647,139 show adapter devices for electrically connecting auxiliary, special purpose equipment such as lights, appliances etc. to a vehicle for operating such equipment. U.S. Pat. No. 4,560,230 discloses a jumper cable connection system which provides for secure attachment of the jumper cable clamps to the battery terminal posts during a jump-start procedure.

The closest known prior art to my improved vehicle battery assembly is shown in U.S. Pat. Nos. 3,466,453; 4,079,304; and 4,157,492. These patents disclose several types of plug connectors for electrically connecting a pair of batteries through an electrical cable for recharging a certain one of the batteries. However, the systems disclosed in these patents utilize battery terminal posts which can prevent transmission of electric current to the starter of a vehicle due to corrosion build-up on the posts. Other disadvantages of these systems include expensive and complex regulating and switching devices, as well as requiring opening of the engine compartment hood of the vehicle to access the system for jump-starting purposes.

There is no known vehicle battery system of which I am aware, other than my present invention, which enables a jump-starting procedure to be rapidly carried out without the possibility of reversal of the polarity of the batteries being electrically connected and with little or no danger of explosion of the batteries, which enables an individual to quickly and easily recharge a dead battery without opening the engine compartment hood of either vehicle, and which can be quickly and easily installed in new or existing vehicles.

DISCLOSURE OF THE INVENTION

Objectives of the present invention include providing a vehicle battery system which provides electric current to a starter of the vehicle, and which provides and receives electric current to and from, respectively, a remote battery for recharging a certain one of the batteries.

Another objective of the present invention is to provide such a vehicle battery system in which the electrical connections between a pair of batteries, required for recharging a certain one of the batteries during a jump-starting procedure, can be quickly and easily made without risk of mismatching or reversing the electrical polarity therebetween.

A further objective of the present invention is to provide such a vehicle battery system in which the danger of explosion of the batteries during a jump-starting procedure, as well as the risk of personal injury or other property damage, is reduced or eliminated.

Still another objective of the present invention is to provide such a vehicle battery system in which the electrical connections required for performing a jump-starting procedure can be made without opening the engine compartment hood of either vehicle.

A still further objective of the present invention is to provide such a vehicle battery system which is economical to manufacture, which is quickly and easily installed in existing vehicles or in new vehicles at a manufacturing plant, and which is durable and reliable in use.

These objectives and advantages of the invention are obtained by the battery system of the type mounted in a vehicle for providing electric current to a starter of the vehicle and for providing and receiving electric current to and from a remote battery, the battery system including, a battery having a casing; a pair of spaced electrodes incorporated in the casing; first and second electrical cables; a pair of universal plugs embedded in the casing, one of the plugs attached to the first electrical cable electrically connecting the battery to the starter, and the other of the plugs attached to the second electrical cable for electrically connecting the battery to the remote battery; and electrical circuit means embedded in the casing for electrically connecting each of the electrodes to a respective one of the universal plugs.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

BEST MODE FOR CARRYING OUT THE INVENTION

Figure 3:
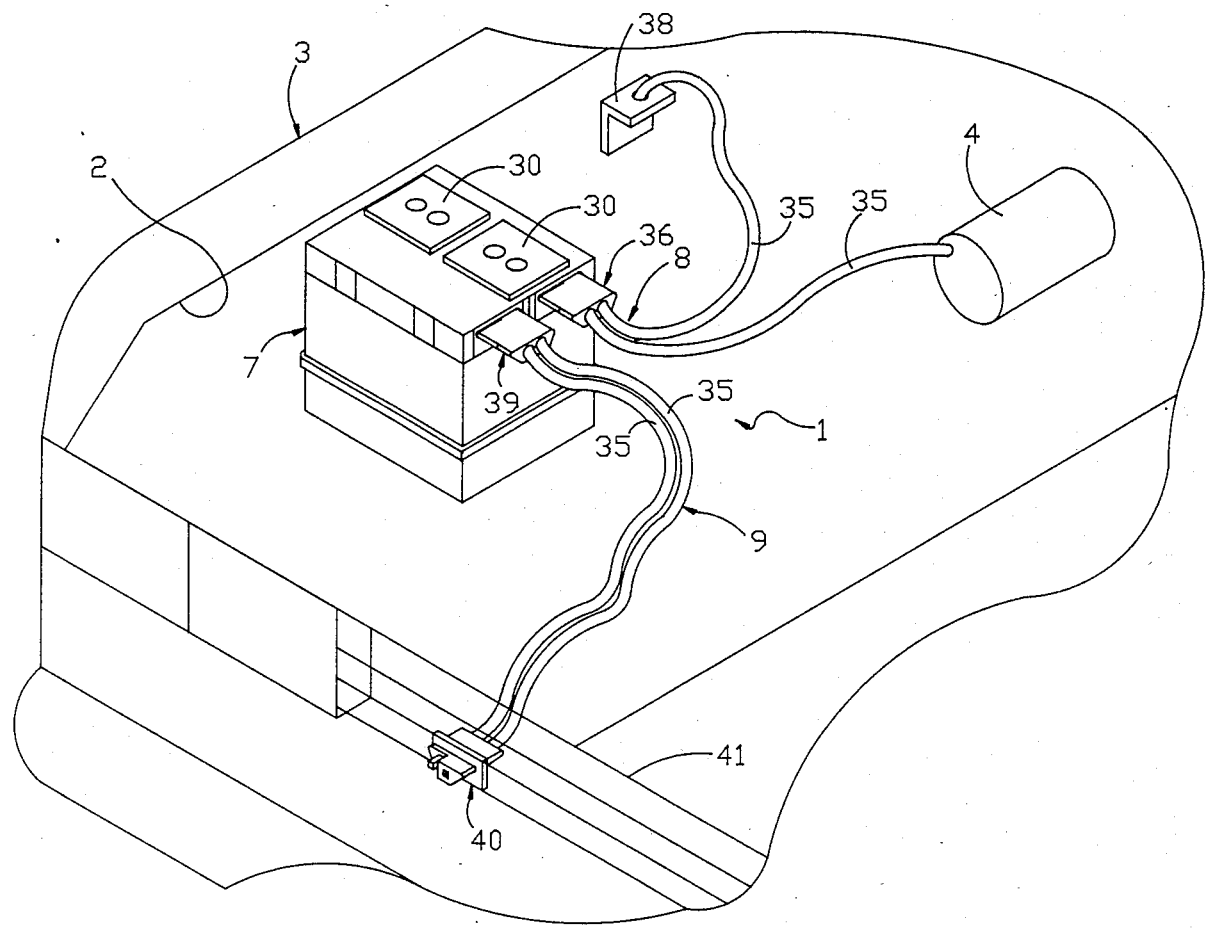
FIG. 3 is a fragmentary diagrammatic perspective view of the battery system installed in a vehicle engine compartment.
Figure 5:
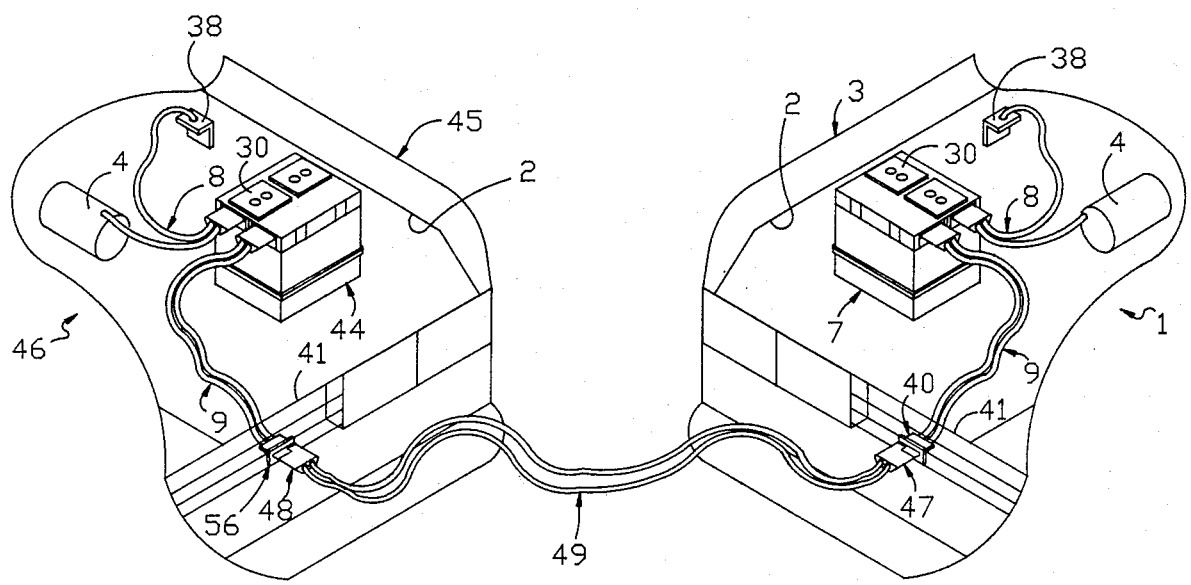
FIG. 5 is a reduced fragmentary diagrammatic perspective view of the battery system of FIG. 3 installed in a pair of vehicles, and showing a booster cable extending between and electrically connecting the battery systems for recharging a certain one of the batteries.
Figure 6:
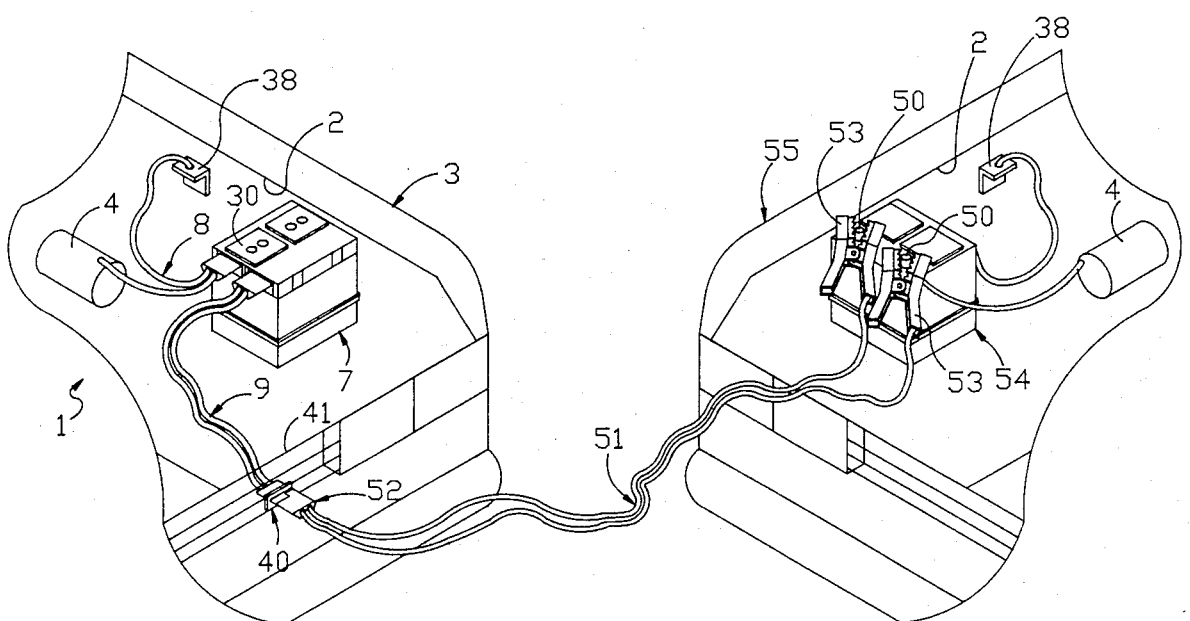
FIG. 6 is a reduced fragmentary diagrammatic perspective view of the battery system of FIG. 3 installed in the left-hand vehicle and of a battery system of the type having a battery with terminal posts installed in the right-hand vehicle, and showing a booster cable extending between and electrically connecting the systems for recharging a certain one of the batteries.

The vehicle battery system of the present invention is indicated generally at 1 and is shown in FIG. 3 installed in an engine compartment 2 of a vehicle 3. System 1, in its normal operating condition, provides electric current to a starter 4 of vehicle 3. System 1 also provides for quick and safe as jump-starting of another vehicle by vehicle 3, as will be described in detail below and as shown in FIGS. 5 and 6.

Battery system 1 includes a battery 7 and first and second electrical cables 8 and 9, respectively (FIG. 3). Battery 7 (FIG. 1) comprises a rectangular-shaped casing 10 having a top wall 11, a bottom wall 14 and spaced side and end wall pairs 12 and 13, respectively. Casing 10 contains an electrolyte solution 17 for providing the electric current of battery 7 in a manner well-known in the art. Upper ends 18 and 18A of a pair spaced electrodes 19 and 19A, respectively, are embedded in top casing wall 11 of battery 7. A lower end 20 of each electrode is immersed in electrolyte solution 17 to establish electrical contact between the electrodes and the electrolyte solution.

Figure 1:
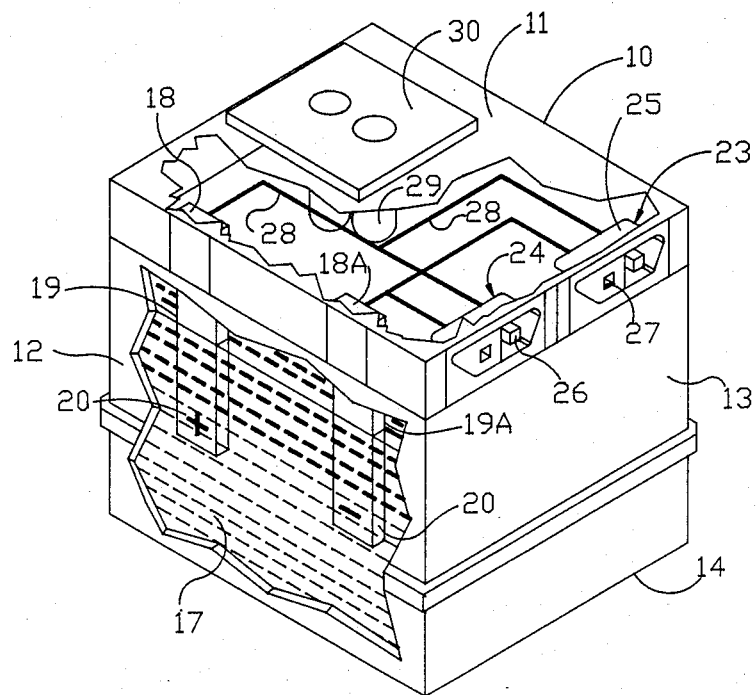
FIG. 1 is a perspective view, with portions broken away, of the battery of the vehicle battery system of the present invention.

In accordance with one of the main features of the invention, a pair of universal plugs 23 and 24 is embedded in the upper end of one of the casng end walls 13 of battery 7 in a spaced relationship as shown in FIG. 1. Plugs 23 and 24 each have a generally rectangular-shaped body 25, with a prong 26 and a receptacle 27 being formed integrally with one end thereof.

A plurality of electrical conductors 28 are embedded in top casing wall 11 of battery 7 and extend between the upper ends of electrodes 19 and 19A and prongs 26 and receptacles 27 of universal plugs 23 and 24 for electrically connecting the electrodes and plugs. The prong and receptacle arrangement of the universal plugs, as well as the configuration of the plug body, ensures that the plugs are engageable with other similar universal plugs in a single orientation for maintaining proper electrical polarity between the engaged plugs, as discussed below.

A plurality of vent tubes 29 (FIG. 1) are embedded in top casing wall 11 of battery 7 for relieving pressure within the battery in a manner well-known in the art. Vent tubes 29 are covered by a pair of vent caps 30 (FIGS. 1 and 3).

Figure 4:
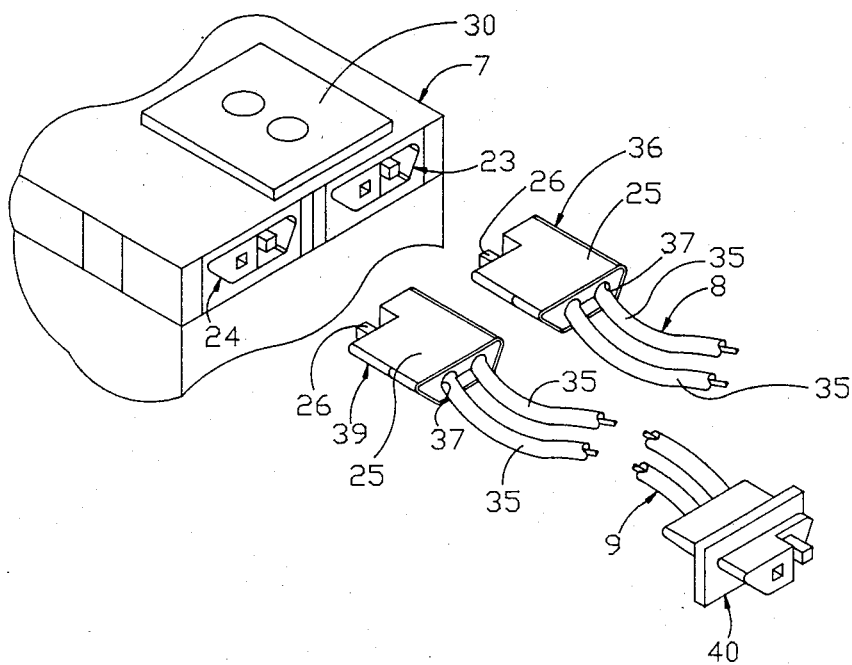
FIG. 4 is an enlarged fragmentary perspective view of the battery system of FIG. 3, particularly showing the universal plugs of the electrical cables prior to engagement with the universal plugs of the battery.

First and second electrical cables 8 and 9, respectively, each include a pair of similar insulated conductors or wires 35 for conducting electric current (FIG. 3). A universal plug 36, which is similar to battery plugs 23 and 24, is attached to one end of first electrical cable 8. Each insulated wire 35 of cable 8 is received in a respective one of a pair of openings 37 (FIG. 4) formed in plug 36. Openings 37 are formed in the end of plug body 25 opposite from plug prong 26 and plug receptacle 27 and are aligned therewith. Each insulated wire 35 is electrically connected to a respective one of the prong and receptacle in a suitable manner. The opposite end of each insulated wire 35 is attached to a respective one of a ground 38 and starter 4 of vehicle 3 in a manner well-known in the art. Thus, battery 7 is electrically connected to starter 4 of vehicle 3 through first electrical cable 8 by slideable engagement of cable plug 36 and battery plug 23 as best shown in FIG. 4, for providing electric current to the starter.

A pair of universal plugs 39 and 40 (FIG. 3) are attached to respective ends of second electrical cable 9 in a manner similar to the attachment of universal plug 36 to cable 8. Plugs 39 and 40 also are similar to battery plugs 23 and 24. Cable plug 39 is slideably engaged with battery plug 24 for electrically connecting battery 7 to the second electrical cable. Cable plug 40 is mounted on a grille 41 of vehicle 3 by any suitable means and with plug prong 26 and receptacle 27 extending outwardly of the grille and engine compartment 2 so that plug 40 can be accessed without opening the engine compartment hood during a jump-starting procedure.

The operation of battery system 1 is set forth below. Battery 7 provides electric current to starter 4 through first electrical cable 8 as described above for starting the engine of vehicle 3. System 1 also enables battery 7 of vehicle 3 to provide and receive electric current to and from, respectively, a battery 44 of another vehicle 45 having a battery system 46 similar to system 1 mounted therein, as shown in FIG. 5. More particularly, a pair of universal plugs 47 and 48 are attached to respective ends of an elongated "booster" or electrical cable 49. Booster cable plugs 47 and 48 also are similar to battery plugs 23 and 24, and are attached to cable 49 in a manner already described above for attachment of the universal plugs to the first and second electrical cables of system 1. Moreover, the construction of cable 49 is similar to the construction of cables 8 and 9. To electrically connect battery systems 1 and 46, plugs 47 and 48 are slideably engaged with plug 40 of system 1 and a similar plug 56 of system 46, respectively. Cable 49 is of sufficient length to enable connection of the cable of the grille plugs of two vehicles which are several feet apart.

In accordance with another of the features of the invention, the grille-mounted plug makes it possible to recharge a dead or uncharged battery of a vehicle without opening the engine compartment hoods of either the disabled or running vehicles where the battery system of the present invention is installed in both vehicles. Moreover, the arrangement of the prong and receptacle of each plug and the configuration of the plug body prevents engagement of the plugs in a condition of reversed polarity. Therefore, the danger of explosion of the batteries from electrical connection of two batteries in reversed polarity, that is, in series instead of in parallel, is reduced or eliminated. In addition, the remote location of the grille plug from the battery prevents a possible spark, cause by engagement of the booster plug with the grille plug during a jump-start procedure, from causing an explosion of the battery.

Thus, the quick-connect plug arrangement of the battery system eliminates the disadvantages encountered by an individual attempting to jump-start vehicles having post-type batteries with a booster cable having battery clamps attached to the ends thereof. Such disadvantages include possible inability to establish electrical contact between the cable clamps and battery posts due to corrosion build-up on the posts, as well as the ever-present danger of battery explosion and personal injury and other property damage due to electrical connection of the batteries in a state of reversed polarity.

In the event that one vehicle 55 involved in a jump-starting procedure has a battery 54 of the type having a pair of spaced terminal posts 50, as is used in most vehicles today, and the other of the vehicles has battery system 1 installed therein, the electrical connections required for jump-starting purposes can still be made in the manner shown in FIG. 6. An electrical booster cable 51, which is similar to booster cable 49, has a universal plug 52 attached to one end thereof, and a pair of battery clamps 53 attached to its other end. Plug 52 is similar to battery plugs 23 and 24 and is attached to cable 51 in a manner similar to the attachment of the other plugs and cables described above. Battery clamps 52 are attached to the two insulated wires of cable 51 in a manner well-known in the art. Plug 52 of cable 51 is slideably engaged with grille-mounted plug 40 of system 1. Battery clamps 53 are engaged with respective terminal posts 50 of battery 54 so that the electrical connection between batteries 7 and 54 is complete. However, care must be taken in this situation to attach the clamps and terminal posts in the proper positions to avoid reversing the polarity of the batteries.

A second embodiment of the vehicle battery system includes an adapter 60 (FIG. 2) which is mounted on a battery 61 of the type having a usual pair of spaced terminal posts 50, for converting battery 61 from a post-type battery to a plug-type battery similar to battery 7 of system 1.

Figure 2:
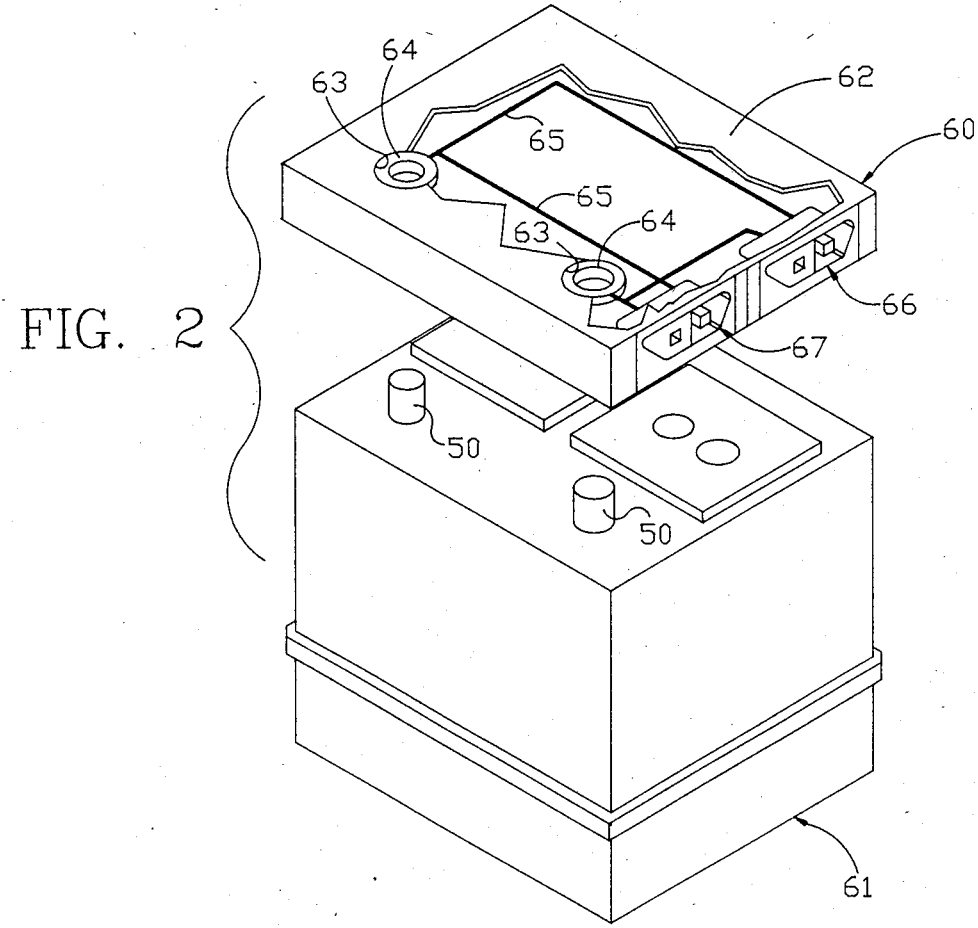
FIG. 2 is an exploded perspective view, with portions broken away, of the battery and adapter of a second embodiment of the vehicle battery system.

Adapter 60 includes a generally flat, rectangular-shaped body 62 formed of a dielectric material (FIG. 2). A pair of spaced, circular-shaped apertures 63 are formed in body 62 and extend therethrough. An annular metal sleeve 64 is mounted within each aperture 63. Sleeves 64 each have an inside diameter substantially equal to the outside diameter of terminal posts 50 of battery 61. Apertures 63 are located to align with terminal posts 50 when adapter 60 is mounted on battery 61, whereupon sleeves 64 contact the posts for electrically connecting the adapter and the battery. A pair of universal plugs 66 and 67, which are similar to plugs 23 and 24 of battery 7 of system 1, are embedded in body 62 in a spaced relationship. A plurality of electrical conductors 65 also are embedded in body 62 and extend between and electrically connect sleeves 64 and plugs 66 and 67.

First and second electrical cables 8 and 9 are connected to adapter 60 in the manner described above for connection of the cables to battery 7. Thus, battery 61 is electrically connected to the starter of the vehicle in which it is mounted by the first electrical cable and can be electrically connected through the second electrical cable to another battery for jump-starting purposes. Thus, advantages and features similar to those obtained by battery 7 of system 1 are obtained by battery 61 and adapter 60.

In summary, the vehicle battery system of the present invention can be quickly and easily installed in existing vehicles or as original equipment at an assembly plant on a new vehicle. Electrical connections between a pair of vehicles having battery system 1 installed therein can be quickly and safely made for jump-starting the vehicle having a dead battery. The construction of the universal plugs of the system battery and cables prevents mismatching polarities during a jump-start procedure if both vehicles have the battery system mounted therein. This prevents possible explosion of the batteries, property damage and personal injury. Moreover, the entire jump-starting procedure can be accomplished without opening the engine compartment hood of either vehicle. Finally, battery terminal posts on which corrosion build-up can form preventing proper electrical contact between a booster cable clamp and the post, is eliminated by the quick-connect plugs of the system.

Accordingly, the battery system of the present invention is simplified, provides an effective, safe, inexpensive, and efficient system which achieves all the enumerated objectives, provides for eliminating difficulties encountered with prior systems and devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the battery system is constructed and used, the characteristics of the system, and the advantageous, new and useful results obtained; the new and useful structures, devices, elements, arrangements, parts, and combinations, are set forth in the appended claims.

What is claimed is:

1. A battery system of the type mounted in a vehicle for providing electric current to a starter of the vehicle and for providing and receiving electric current to and from a remote battery, said battery system including:
   (a) a battery having a casing;
   (b) a pair of spaced electrodes incorporated in said casing;
   (c) a first electrical cable having a universal plug attached to one end thereof, with an opposite end of the first electrical cable being adapted for electrical connection to the starter and a ground of the vehicle;
   (d) a second electrical cable having a universal plug attached to each end thereof, with a selected one of the universal plugs of the second electrical cable being mounted on a grille of the vehicle and further being accessible without opening an engine compartment hood of the vehicle;
   (e) a pair of universal plugs embedded in the battery casing, with the universal plug of the first electrical cable being engageable with a selected one of the universal plugs of the battery in a single orientation for electrically connecting the battery to the starter, and with the other of the universal plugs of the second electrical cable being engageable with the other of the universal plugs of the battery in a single orientation for electrically connecting the second electrical cable and the battery; and
   (f) electrical circuit means embedded in the casing for electrically connecting each of the electrodes to a respective one of the universal plugs of the battery.

2. The system defined in claim 1 in which each of the universal plugs comprises a prong and a receptacle, so that the universal plugs are engageable with other similar universal plugs in a single orientation for maintaining proper electrical polarity therebetween.

3. The system defined in claim 1 in which an elongated booster cable has a universal plug attached to each of its ends; in which a selected one of the booster cable plugs is engageable with the grille-mounted plug of the second electrical cable in a single orientation for electrically connecting the booster cable and said second electrical cable; and in which the other of the booster cable plugs is adapted to be engageable with a remote battery for electrically connecting the booster cable and said remote battery.

4. The system defined in claim 1 in which a universal plug is attached to one end of the booster cable and is engageable with the grille-mounted plug of the second electrical cable; and in which an opposite end of the booster cable has a pair of battery clamps attached thereto which are engageable with a pair of terminal posts of the remote battery for electrically connecting the booster cable and said remote battery.

5. A battery of the type adapted to be mounted in a vehicle for providing electric current to a starter of the vehicle through a first electrical cable, and for supplying and receiving electric current to and from a remote battery through a second electrical cable, said battery including:
   (a) a casing;
   (b) a pair of spaced electrodes incorporated in said casing;
   (c) a pair of universal plugs embedded in the casing, with a selected one of said plugs being slideably engageable in a single orientation with a universal plug attached to one end of the first electrical cable, and an opposite end of the first electrical cable being adapted for electrical connection to the starter and a ground of the vehicle, for electrically connecting the battery to the starter, and with the other of said universal plugs of the casing being slideably engageable in a single orientation with a selected one of a pair of universal plugs attached to the ends of the second electrical cable for electrically connecting said second electrical cable and the battery, and the other of the universal plugs of the second electrical cable being mounted on a grille of the vehicle and further being accessible without opening an engine compartment hood of the vehicle.
   (d) electrical circuit means embedded in the casing for electrically connecting each of the electrodes to a respective one of the universal plugs of the casing.

6. The battery defined in claim 5 in which the casing is comprised of top, bottom, side and end walls; in which one end of each of the electrodes is immersed in an electrolyte solution contained within the casing; and in which an opposite end of each of said electrodes is embedded in the top wall of the casing.

7. The battery defined in claim 6 in which the universal plugs are embedded in one of the side walls of the battery; and in which the electrical circuit means is a plurality of electrical conductors.

8. The battery defined in claim 5 in which each of the pair of universal plugs comprises a prong and a receptacle; and in which the prong of each plug is slideably engageable with the receptacle of each plug so that the universal plugs are engageable with other similar universal plugs in a single orientation for maintaining proper electrical polarity therebetween.

9. The battery defined in claim 5 in which a booster cable has a universal plug attached to each of its ends; in which a selected one of the booster cable plugs is slideably engageable with the grille-mounted plug of the second electrical cable in a single orientation for electrically connecting the booster cable and said second electrical cable; and in which the other of the booster cable plugs is adapted to be engageable with a remote battery for electrically connecting the booster cable and said remote battery.

10. The battery defined in claim 5 in which a universal plug is attached to one end of the booster cable and is slideably engageable with the grille-mounted plug of the second electrical cable; and in which an opposite end of the booster cable has a pair of battery clamps attached thereto which are engageable with a pair of terminal posts of the remote battery for electrically connecting the booster cable and said remote battery.

11. An adapter for converting a vehicle battery of the type having a pair of spaced terminal posts into a battery having a pair of universal plugs for electrically connecting said battery to a starter of the vehicle through a first electrical cable and for electrically connecting said battery to a remote battery through a second electrical cable for recharging a certain one of said batteries, said adapter including:
 (a) a body;
 (b) a pair of spaced apertures formed in said body, said apertures being located to align with and to receive the terminal posts therein when the adapter is mounted on the battery;
 (c) electrical contact means mounted in the body adjacent to the apertures for contacting the terminal posts when the adapter is mounted on the battery;
 (d) a pair of universal plugs embedded in the body, one of said plugs adapted to be attached to the first electrical cable for electrically connecting the adapter to the starter, and the other of said plugs adapted to be attached to the second electrical cable for electrically connecting the adapter to the remote battery; and
 (e) electrical circuit means embedded in the body for electrically connecting the electrical contact means of the apertures to the universal plugs.

12. The device defined in claim 11 in which the body is a generally flat, rectangular-shaped block of a dielectric material.

13. The device defined in claim 11 in which the pair of spaced apertures are circular-shaped and extend through said body; in which the electrical contact means is a pair of annular metallic sleeves, each of said sleeves being mounted in a respective one of the apertures; and in which said sleeves have an inside diameter substantially equal to the outside diameter of the terminal posts so as to provide electrical contact therewith when the terminal posts are slideably received within the sleeves.

* * * * *